United States Patent [19]

Kawamura et al.

[11] Patent Number: 4,827,170
[45] Date of Patent: * May 2, 1989

[54] ELECTRIC GENERATOR FOR USE IN TURBOCHARGER

[75] Inventors: Hideo Kawamura, Samukawa; Katsuyuki Tamai, Yokohama, both of Japan

[73] Assignee: Isuzu Motors Limited, Tokyo, Japan

[*] Notice: The portion of the term of this patent subsequent to Sep. 22, 2004 has been disclaimed.

[21] Appl. No.: 41,763

[22] Filed: Apr. 21, 1987

[30] Foreign Application Priority Data

Apr. 25, 1986 [JP] Japan .................. 61-095970

[51] Int. Cl.⁴ .............. H02K 15/10; H02K 21/14; F02B 37/14
[52] U.S. Cl. .................... 310/156; 60/608; 290/52; 310/113; 417/407
[58] Field of Search ............ 60/598, 607, 608; 310/156, 113, 102; 417/407

[56] References Cited

U.S. PATENT DOCUMENTS

| | | | |
|---|---|---|---|
| 4,130,769 | 12/1978 | Karube | 310/156 |
| 4,433,261 | 2/1984 | Nashiki et al. | 310/156 |
| 4,638,200 | 1/1987 | Le Corre et al. | 310/156 |
| 4,694,654 | 9/1987 | Kawamura | 310/156 |

FOREIGN PATENT DOCUMENTS

| | | | |
|---|---|---|---|
| 1942855 | 8/1973 | Fed. Rep. of Germany | 310/156 |
| 101540 | 6/1984 | Japan | 310/113 |

Primary Examiner—Patrick R. Salce
Assistant Examiner—D. L. Rebsch
Attorney, Agent, or Firm—Staas & Halsey

[57] ABSTRACT

An electric generator for use in a turbocharger includes a rotor mounted on the rotational shaft of the turbocharger and comprising a single permanent magnet fitted in an outer cylindrical sleeve which prevents the rotor from breakage upon high-speed rotaiton thereof. The rotor also includes heat insulation between the permanent magnet and the rotation shaft. The heat insulation portion may be an air gap or a heat insulating member.

5 Claims, 2 Drawing Sheets

ELECTRIC GENERATOR FOR USE IN TURBOCHARGER

BACKGROUND OF THE INVENTION

The present invention relates to an electric generator for use on the rotational shaft of a turbocharger which can be driven by the exhaust energy discharged by an internal combustion engine, and more particularly to such an electric generator having a rotor which is capable of withstanding high-speed rotation and is resistant to heat.

In recent years, turbochargers find widespread use on internal combustion engines. The turbochargers have an exhaust turbine which is rotated by the heat energy of the exhaust gas discharged from the internal combustion engine. A compressor directly coupled to the exhaust turbine is driven thereby to deliver compressed air to the internal combustion engine. One turbocharger design includes a generator/motor having a rotor mounted on the rotational shaft of the turbocharger. When the exhaust turbine is rotated by the exhaust gas, the rotor is also driven to generate electric power so that the exhaust energy can be regenerated as electric energy. The rotor can also be driven by the electric power supplied from an inverter powered by a battery to assist the compressor in supercharging the engine.

U.S. Pat. No. 4,433,261 discloses, as such a turbocharger incorporating such a directly coupled generator, a gas turbine generator having a rotor disposed between turbine and compressor blades and comprising divided permanent magnets fitted in a cylinder.

In the disclosed gas turbine generator, the permanent-magnet rotor is mounted on the turbine shaft which rotates at a high speed, thus providing an AC machine. However, the size and arrangement of the rotor are not suitable for high-speed rotation. More specifically, where the rotor is of a large diameter and has an increased weight, its inertia is large and its response to changes in the rotational speed thereof is poor. Further, the rotational shaft produces flexural vibration with respect to its bearings, and suffers the danger of breakage due to resonance. The rotor composed of divided permanent magnets fitted in a cylinder is not suitable for high-speed rotation since it is difficult to reduce the amount of imbalance thereof.

Inasmuch as the rotational shaft and the permanent magnets are held in direct contact with each other, the heat from the turbine blades exposed to the high-temperature exhaust gas is transmitted through the rotational shaft to the permanent magnets. Therefore, the permanent magnets are demagnetized by an increase in temperature, resulting in a reduction in the amount of electric power generated by the generator.

SUMMARY OF THE INVENTION

It is an object of the present invention to provide an electric generator for use in a turbocharger, which has a rotor prevented from breakage due to resonance of a rotational shaft and imbalance thereof even when the turbocharger rotates at a high speed, the rotor having a magnet prevented from a temperature rise which would otherwise be caused by heat transmitted from high-temperature turbine blades.

According to the present invention, there is provided an electric generator for use on the rotational shaft of a turbocharger which can be driven by the exhaust energy discharged by an internal combustion engine, the electric generator comprising a rotor including a single permanent magnet, an outer cylindrical sleeve made of a material having a high tensile strength, the permanent magnet being force-fitted in the outer cylindrical sleeve, and a heat insulating portion adapted to be disposed between the rotational shaft and the permanent magnet.

The outer cylindrical sleeve made of a material having a high tensile strength and the single permanent magnet force-fitted in the outer cylindrical sleeve are mounted on the rotational shaft of a turbine. The rotor is of a cylindrical outer shape, so that it can easily be well balanced and withstand centrifugal forces acting thereon due to high-speed rotation. The heat insulation portion between the rotational shaft and the permanent magnet is effective in blocking heat which would be transmitted from turbine blades through the rotational shaft to the permanent magnet. As a result, demagnetization of the permanent magnet which would be caused by a temperature rise thereof is prevented.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
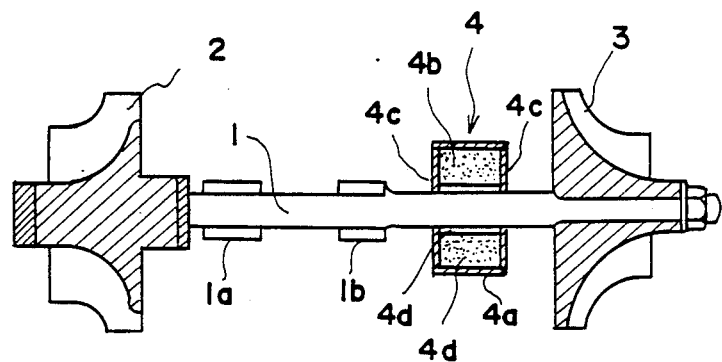
FIG. 1 is a longitudinal cross-sectional view of a rotational shaft and a rotor of an electric generator in a turbocharger according to an embodiment of the present invention.

As shown in FIG. 1, a turbocharger has a rotational shaft 1 supporting on its opposite ends turbine blades 2 and compressor blades 3 and rotatably supported at its intermediate portion by bearings 1a, 1b in a body of the turbocharger.

A small-size rotor 4 having a permanent magnet is of a hollow cylindrical shape. The rotational shaft 1 extends through the hollow portion of the rotor 4, which is mounted on the rotational shaft 1 between the compressor blades 3 and the bearing 1b.

Figure 2:
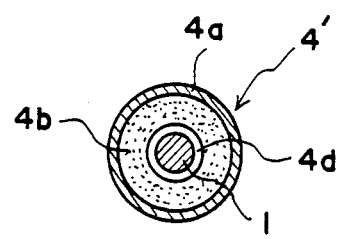
FIG. 2 is a transverse cross-sectional view of the rotor.

As illustrated in FIG. 2, the rotor 4 includes an outer cylindrical sleeve 4a made of a material having a high tensile strength, such as a titanium alloy. The rotor 4 also includes a single permanent magnet 4b force-fitted in the outer cylindrical sleeve 4a and made of a rare earth element having strong residual magnetic forces. Two side plates 4c which are made of the same material as that of the outer cylindrical sleeve 4a are fitted therein and disposed respectively on opposite sides of the permanent magnet 4b to secure the outer cylindrical sleeve 4a and the permanent magnet 4b to the rotational shaft 1. An air gap 4d serving as a heat insulating portion for blocking heat transfer is defined between the cylindrical permanent magnet 4b and the rotational shaft 1. The permanent magnet 4b is magnetized to produce lines of strong magnetic force in a prescribed radial direction.

Figure 3:
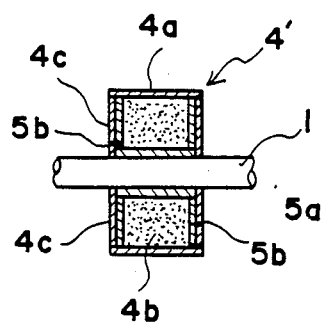
FIG. 3 is a transverse cross-sectional view of a rotor according to another embodiment of the present invention.

FIG. 3 shows a rotor 4' having a heat insulating member as a heat insulating portion. Like or corresponding parts are denoted by like or corresponding reference characters in FIGS. 2 and 3. A heat insulating sleeve 5a is disposed between the permanent magnet 4b and the rotational shaft 1 for preventing heat transfer from the rotational shaft 1 to the permanent magnet 4b. Heat insulating plates 5b are disposed between the side plates 4c and the permanent magnet 4b for preventing heat transfer from the side plates 4c to the permanent magnet 4b. Thus, demagnetization of the permanent magnet 4b which would result from a temperature rise thereof is prevented.

The outer cylindrical sleeve 4a and the side plates 4c may be formed of partially stabilized zirconia for giving them mechanical strength to retain the permanent magnet 4b and heat insulation capability.

Figure 4:
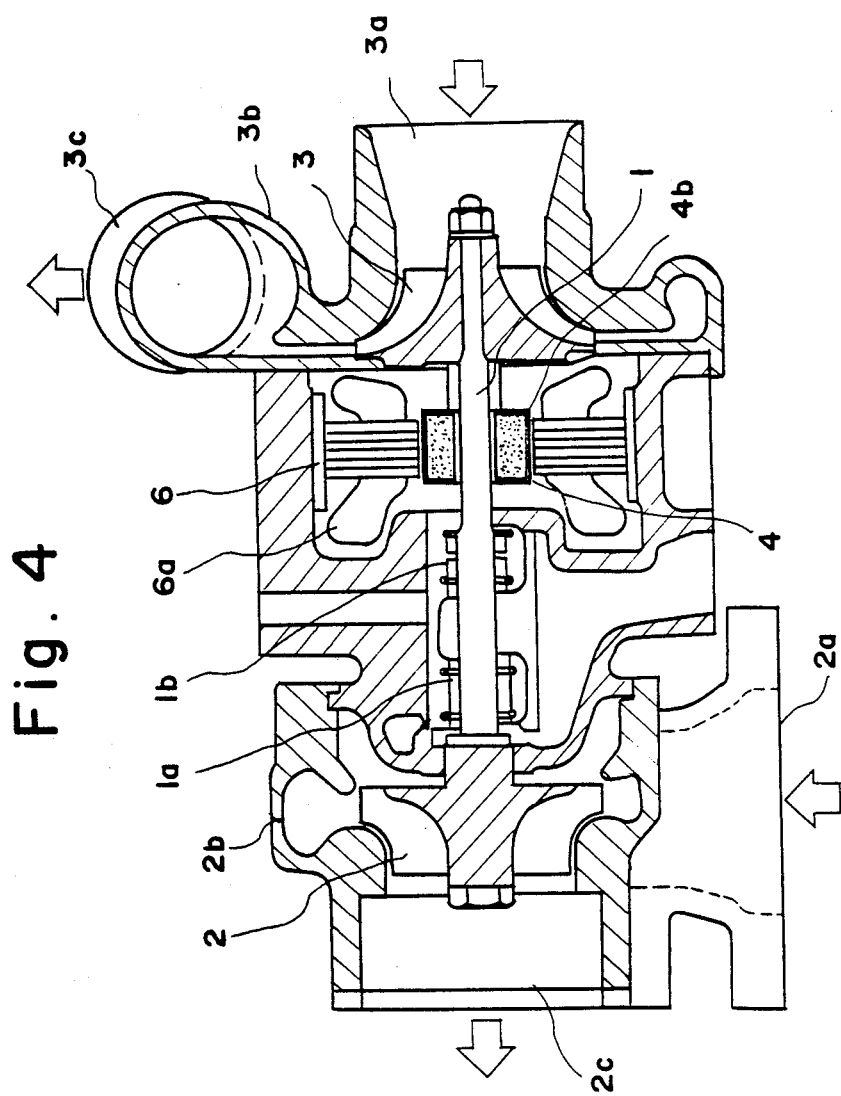
FIG. 4 is a cross-sectional view of a turbocharger incorporating an electric generator according to the present invention.

FIG. 4 shows, in cross section, a turbocharger incorporating an electric generator according to the present invention. The rotational shaft 1 is rotatably supported by bearings 1a, 1b in a body of the turbocharger.

The rotor 4 is surrounded by a stator 6 having stator windings 6a. The rotor 4 and the stator 6 jointly constitute an AC generator which generates AC power upon rotation of the rotor 4.

The turbocharger has an exhaust gas inlet 2a coupled to the exhaust pipe of an internal combustion engine (not shown). The exhaust gas emitted from the exhaust pipe is introduced through the exhaust gas inlet 2a into a turbine housing 2b in which the exhaust gas drives turbine blades 2. The exhaust gas is thereafter discharged through an exhaust gas outlet 2c. The turbocharger also has an air inlet 3a for drawing air which is compressed in a compressor housing 3b upon rotation of compressor blades 3. The compressed air is then delivered from an air outlet 3c into the intake pipe of the internal combustion engine. Operation of the turbocharger is as follows:

The exhaust gas emitted from the internal combustion engine is delivered via the exhaust gas inlet 2a into the turbine housing 2b. The turbine blades 2 are driven by the energy of the exhaust gas to rotate at a high speed for thereby rotating the shaft 1 rotatably supported by the bearings 1a, 1b. The compressor blades 3 rotate in the compressor housing 3b to compress air introduced through the air inlet 3a and feed the compressed air from the air outlet 3c through the intake pipe into the internal combustion engine, thereby increasing the boost pressure to increase the power output of the internal combustion engine.

Since the rotor 4 mounted on the shaft 1 is coupled coaxially to the turbine blades 4, the rotor 4 is also rotated at high speed. Due to high-speed rotation of the permanent magnet having strong residual magnetism, alternating magnetic fluxes cross the stator windings 6a of the stator 6 to enable the latter to produce electromotive forces, which are converted to a direct current via a rectifier for charging a battery, for example. Thus, the exhaust energy is regenerated as electric power.

Since the outer cylindrical sleeve 4a of high tensile strength is force-fitted over the cylindrical permanent magnet 4b which rotates at a high speed, the rotor 4 is firmly held in place against damage or breakage under centrifugal forces upon high-speed rotation at a speed of about 100,000 revolutions per second. Heat from the turbine blades 2 exposed to the high-temperature exhaust gas through the shaft 1 is not transmitted to the permanent magnet 4b since the shaft 1 and the permanent magnet 4b are not directly held against each other but are spaced from each other by the gap 4d or the heat insulating sleeve 5a. Accordingly, the permanent magnet 4b is prevented from being demagnetized by a temperature rise which would otherwise be caused.

Where the turbine blades 2 are made of fine ceramics having good heat insulating ability and high mechanical strength, the turbine blades 2 are lightweight, and hence the shaft 1 is prevented from flexural vibration with respect to the bearings and allows stable high-speed rotation.

With the arrangement of the present invention, as described above, the rotor mounted on the rotational shaft of the turbine blades has the single permanent magnet fitted in the outer cylindrical sleeve of high tensile strength. Therefore, the rotor is of an outer cylindrical shape and can easily be well balanced. Centrifugal forces applied to the rotor upon high-speed rotation of the turbine are held by the outer cylindrical sleeve, thus preventing an accident such as breakage of the rotor from taking place during operation.

Inasmuch as a heat insulating structure is disposed between the permanent magnet and the rotational shaft, heat transfer from the turbine blades via the rotational shaft is blocked by the heat insulating structure. The permanent magnet is thus prevented from being demagnetized by a temperature increase, and is capable of producing strong magnetic fluxes which cross the stator windings.

The principles of the present invention are not limited to a turbocharger, but may be exemplified in an electric generator for use in a turbine.

Although certain preferred embodiments have been shown and described, it should be understood that many changes and modifications may be made therein without departing from the scope of the appended claims.

What we claim is:

1. A rotor for an electric generator for use on a rotational shaft of a turbocharger which can be driven by the exhaust energy discharged by an internal combustion engine, comprising:
   a single permanent magnet positioned about the rotational shaft;
   an outer cylindrical sleeve positioned about said permanent magnet so that said permanent magnet is force-fitted in said outer cylindrical sleeve, said permanent magnet comprising a material having a high tensile strength;
   side plates respectively positioned on opposing sides of said permanent magnet and attached to said outer cylindrical sleeve so as to fix said outer cylindrical sleeve to the rotational shaft; and
   a heat insulating portion disposed between the rotational shaft and said permanent magnet.

2. A rotor for an electric generator according to claim 1, wherein said heat insulating portion comprises an air gap.

3. A rotor for an electric generator according to claim 1, wherein said heat insulating portion comprises a heat insulating member.

4. A rotor for an electric generator according to claim 1, wherein said outer cylindrical sleeve is made of a titanium alloy.

5. A rotor for an electric generator according to claim 1, further comprising:
   heat insulating plates respectively disposed between said side plates and said permanent magnet.

* * * * *